US011036204B2

(12) United States Patent
Nagashima

(10) Patent No.: US 11,036,204 B2
(45) Date of Patent: Jun. 15, 2021

(54) NUMERICAL CONTROLLER

(71) Applicant: Fanuc Corporation, Yamanashi (JP)

(72) Inventor: Noritake Nagashima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 207 days.

(21) Appl. No.: 16/426,233

(22) Filed: May 30, 2019

(65) Prior Publication Data

US 2019/0369601 A1  Dec. 5, 2019

(30) Foreign Application Priority Data

Jun. 5, 2018 (JP) .............................. JP2018-107842

(51) Int. Cl.
*G05B 19/4155* (2006.01)
*G05B 19/05* (2006.01)

(52) U.S. Cl.
CPC ......... *G05B 19/4155* (2013.01); *G05B 19/05* (2013.01); *G05B 19/052* (2013.01); *G05B 2219/39401* (2013.01)

(58) Field of Classification Search
USPC ........................................................ 700/186
See application file for complete search history.

(56) References Cited

U.S. PATENT DOCUMENTS

| | | | | |
|---|---|---|---|---|
| 4,663,730 A | * | 5/1987 | Ikeda | G05B 19/4147 700/23 |
| 5,963,444 A | * | 10/1999 | Shidara | G05B 19/052 700/7 |
| 5,986,425 A | * | 11/1999 | Onishi | G05B 19/19 318/569 |
| 2003/0225812 A1 | * | 12/2003 | Nagashima | G05B 19/4147 718/102 |

FOREIGN PATENT DOCUMENTS

| | | |
|---|---|---|
| JP | 57191703 A | 11/1982 |
| JP | 03189704 A | 8/1991 |
| JP | 103307 A | 1/1998 |
| JP | 1091221 A | 4/1998 |
| JP | 2002108419 A | 4/2002 |
| JP | 3715258 B2 | 9/2005 |

OTHER PUBLICATIONS

Japanese Decision to Grant a Patent for Japanese Application No. 2018-107842, dated Sep. 29, 2020, with translation, 5 pages.

\* cited by examiner

*Primary Examiner* — Mohammad Ali
*Assistant Examiner* — Joshua T Sanders
(74) *Attorney, Agent, or Firm* — RatnerPrestia

(57) ABSTRACT

Provided is a numerical controller capable of efficient signal transmission and reception to and from a retrofitted PLC. A numerical controller includes a numerical control unit, a built-in PLC, and a retrofitted PLC operating at a predetermined control period different from those of the numerical control unit and the built-in PLC. The retrofitted PLC is configured to detect external triggers issued from the numerical control unit and the built-in PLC, execute a sequence processing for numerical control processing upon detection of the external trigger issued from the numerical control unit, and execute a sequence processing for built-in PLC processing upon detection of the external trigger issued from the built-in PLC.

5 Claims, 8 Drawing Sheets

FIG.7

| CRITICAL EVENT TABLE | | |
|---|---|---|
| TYPE | EVENT | REMARK |
| SIGNAL | G8.4(=0) | EMERGENCY STOP SIGNAL |
| SIGNAL | ... | ... |
| NC ALARM | SV0010 | SV OVERHEAT |
| NC ALARM | ... | ... |
| PMC ALARM | ER33 | I/O LINK ERROR |
| PMC ALARM | ... | ... |
| ... | | |

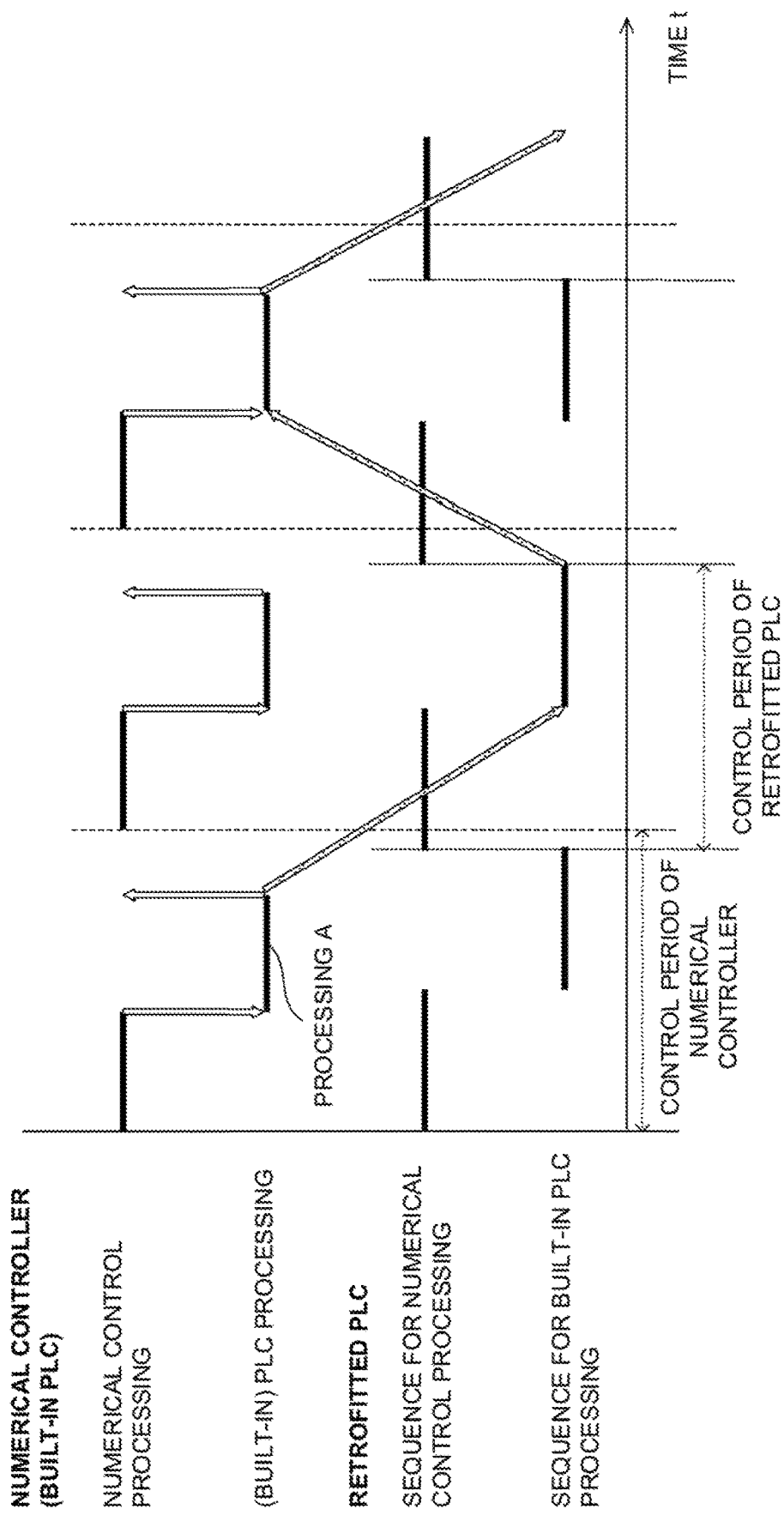

NUMERICAL CONTROLLER

RELATED APPLICATIONS

The present application claims priority to Japanese Patent Application Number 2018-107842 filed Jun. 5, 2018, the disclosure of which is hereby incorporated by reference herein in its entirety.

BACKGROUND OF THE INVENTION

1. Field of the Invention

The present invention relates to a numerical controller, and more particularly to a numerical controller that controls a retrofitted PLC.

2. Description of the Related Art

A numerical controller is used to control a machine tool. Such a numerical controller includes a numerical control processing unit that performs numerical control processing at high speed and a sequence processing unit (which is referred to as "programmable logic controller" (PLC)) that performs a sequence processing based on a sequence program. Since the processing in the numerical controller is performed through cooperation of processors of the individual processing units, the numerical controller achieves significant improvement in terms of the processing speeds of the numerical control processing and the sequence processing.

The processing in the numerical controller that includes the numerical control processing unit and the sequence processing unit is executed by the processors of the individual processing units in parallel with each other. When the sequence processing unit executes its processing in response to reception of a command signal F output from the numerical control processing unit, there are some cases where start of the processing in the sequence processing unit is delayed depending on the time point at which the sequence processing unit receives the command signal F. Also, when the numerical control processing unit executes its processing in response to reception of a command signal G output from the sequence processing unit, there are some cases where start of the processing in the numerical control processing unit is delayed depending on the time point at which the numerical control processing unit receives the command signal G. In order to address such a problem, for example, Japanese Patent No. 3715258 discloses techniques for controlling the timing of the numerical control processing by the numerical control processing unit and the sequence processing by the sequence processing unit.

Protection is implemented on the sequence program to be executed by a built-in PLC incorporated into the numerical controller that controls the machine tool by the manufacturer that has developed the numerical controller. As a result, when a peripheral device provided by a third party is added to the machine tool, a retrofitted PLC needs to be additionally provided so that the peripheral device that has been added can be controlled using the retrofitted PLC.

Meanwhile, the sequence program of the retrofitted PLC is executed independently of the programs of the numerical controller. When the retrofitted PLC is configured, for example, to process multiple sequence programs in parallel with each other, a gap may be created between the time point at which the sequence processing to be executed for each control period by the built-in PLC in accordance with the sequence program is actually executed and the time point at which the sequence processing to be executed for each control period by the retrofitted PLC in accordance with the sequence program is actually executed. As a result, when a signal is to be transmitted to the retrofitted PLC in accordance with the sequence processing executed by the built-in PLC in the numerical controller, there is a possibility that efficient signal transmission may not be realized. Such a problem associated with signal transmission may be conspicuous in a situation where a critical event has occurred and a signal ensuring safe operation of a machine needs to be transmitted from the built-in PLC to the retrofitted PLC.

FIG. 8 is a diagram that illustrates a timing chart of the numerical control processing sequence and the PLC sequence executed by the numerical controller and the retrofitted PLC according to the related art. According to the techniques disclosed in Japanese Patent No. 3715258, processing timing is controlled between the numerical control processing executed in the numerical controller and the PLC processing (executed by the built-in PLC) (indicated by white arrows in FIG. 8). However, control is not performed on the processing timing between the PLC processing executed by the built-in PLC and the PLC processing sequence executed by the retrofitted PLC. As a result, for example, even when a signal is output to the retrofitted PLC in a processing A executed by the built-in PLC, the retrofitted PLC cannot receive the signal in the control period that is parallel to the control period in which the built-in PLC has transmitted the signal. The retrofitted PLC receives the signal in the next control period following the control period in which the built-in PLC has transmitted the signal, and executes the PLC sequence processing (shaded arrows in FIG. 8). Hence, according to traditional schemes, a delay associated with signal transmission occurs, making it difficult to realize efficient signal transmission.

An object of the present invention therefore is to provide a numerical controller capable of efficiently transmitting and receiving signals to and from the retrofitted PLC.

SUMMARY OF THE INVENTION

A numerical controller according to some embodiments includes a feature for notifying execution timing of numerical control processing and built-in PLC processing to a retrofitted PLC. The numerical controller according to the embodiments solves the above-described problem by changing the execution start, timing of the multiple sequence processing of the retrofitted PLC based on the notified execution timing.

Also, an aspect of the embodiments provides a numerical controller which includes a numerical control unit, a built-in PLC, and a retrofitted PLC operating at a predetermined control period different from those of the numerical control unit and the built-in PLC. The retrofitted PLC is configured to detect external triggers issued from the numerical control unit and the built-in PLC, execute a sequence processing for numerical control processing upon detection of the external trigger issued from the numerical control unit, and execute a sequence processing for built-in PLC processing upon detection of the external trigger issued from the built-in PLC.

According to the embodiments, the numerical control processing and the built-in PLC processing are executed in conjunction with the corresponding sequence processing of the retrofitted PLC and high-speed response processing can be achieved. Also, in an emergency, emergency processing is performed at an earlier stage by the retrofitted PLC, which makes it possible to achieve sequence processing by a highly flexible retrofitted PLC.

BRIEF DESCRIPTION OF THE DRAWINGS

The above and other objects and features of the present invention will be apparent from the following description of embodiments with reference to the accompanying drawings in which:

FIG. 7 is a diagram illustrating an example of a critical event table; and

FIG. 8 is a diagram for explanation of operation delay in a retrofitted PLC in a numerical controller according to a related art.

DETAILED DESCRIPTION OF THE PREFERRED EMBODIMENTS

Embodiments of the present invention will be described hereinbelow with reference to the drawings.

Figure 1:
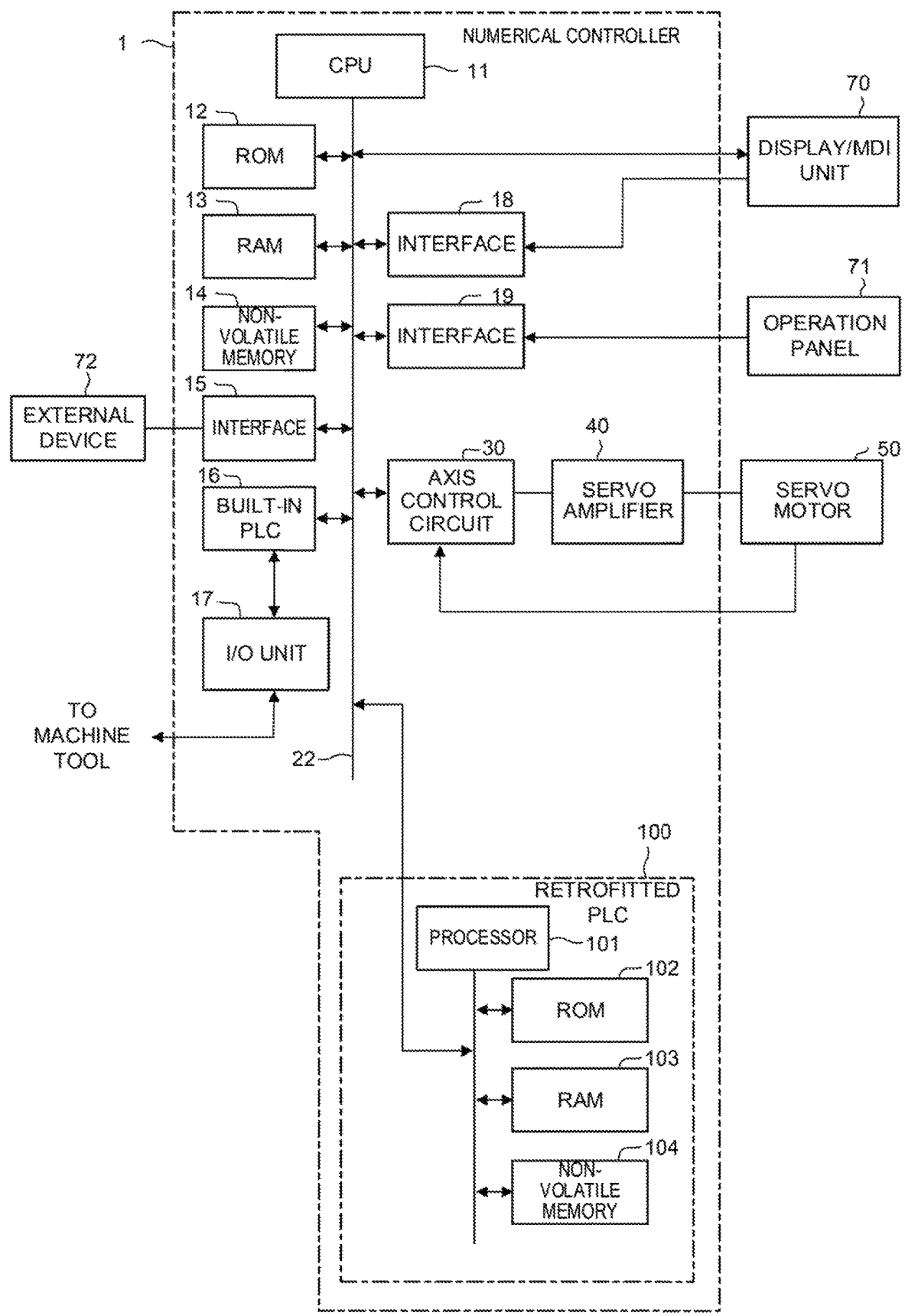
FIG. 1 is a hardware configuration diagram schematically illustrating a numerical controller according to an embodiment.

FIG. 1 is a hardware configuration diagram that schematically illustrates a numerical controller according to an embodiment of the present invention. A numerical controller 1 is implemented on a controller that controls a manufacturing machine such as a robot and a machine tool.

The numerical controller 1 includes a central processing unit (CPU) 11 which totally controls the numerical controller 1. The CPU 11 reads a system program stored in a read only memory (ROM) 12 via a bus 22 so as to control the numerical controller 1 as a whole in accordance with the system program. A random access memory (RAM) 13 may store pieces of temporary data associated with calculation and display and temporarily store various pieces of data input by an operator using a not-shown input unit.

A non-volatile memory 14 may be backed up by a not-shown battery. The non-volatile memory 14 is capable of maintaining its storage state regardless of whether or not power is supplied to the numerical controller 1. The non-volatile memory 14 may store the control program read from an external device 72 via an interface 15 and a control program input via a display/manual data input (MDI) unit 70. Also, various pieces of data acquired from components of the numerical controller 1, the manufacturing machine, a sensor, and the like may be stored in the non-volatile memory 14. The control program and the various pieces of data stored in the non-volatile memory 14 may be loaded into the RAM 13 when they are executed and/or used. Also, various system programs including a known analysis program may be written to the ROM 12 in advance.

The interface 15 is an interface for connecting the numerical controller 1 to the external device 72 such as an adapter. Control programs and various parameters are read from the external device 72. Also, the control programs, various parameters, and pieces of data edited in the numerical controller 1 may be stored in an external storage unit via the external device 72. A built-in PLC 16 controls the manufacturing machine and peripheral devices (e.g., an actuator such as a robot hand for tool change, a sensor installed in the manufacturing machine, etc.) of the manufacturing machine using a sequence program built into the numerical controller 1. At this point, the built-in PLC 16 outputs a control signal via an I/O unit 17 to the manufacturing machine and the peripheral device(s) of the manufacturing machine. Also, the built-in PLC 16 receives signals from various switches provided on an operation panel arranged on the body of the manufacturing machine, the peripheral device(s), etc., carries out necessary processing on the signals, and delivers the signals that have been processed to the CPU 11.

A display/MDI unit 70 is a manual data input device that may include a display, a keyboard, etc. An interface 18 may receive a command and data from the keyboard of the display/MDI unit 70 and deliver them to the CPU 11. An interface 19 is connected to an operation panel 71 which may include a manual pulse generator and the like for use in driving the axes manually.

An axis control circuit 30 controls the axes of the manufacturing machine. The axis control circuit 30 receives information on the amount of movement of the axes from the CPU 11 and outputs an axis movement command to a servo amplifier 40. The servo amplifier 40 upon reception of this command drives a serve motor 50 that moves the axes of the manufacturing machine. The servo motor 50 may have a position and speed detector. The servo motor 50 feeds back a position/speed feedback signal from this position and speed detector to the axis control circuit 30, and performs position/speed feedback control. The hardware configuration diagram of FIG. 1 illustrates one axis control circuit 30, one serve amplifier 40, and one servo motor 50. Meanwhile, in practice, the actual numbers of the axis control circuit 30, the servo amplifier 40, and the servo motor 50 may be provided in accordance with the number of axes of the manufacturing machine to be controlled.

A retrofitted PLC 100 includes a processor 101, a ROM 102, a RAM 103, and a non-volatile memory 104. The processor 101 executes the sequence processing. The ROM 102 may store a control software program for the sequence control, etc. The RAM 103 may be used to record signals exchanged with at least either of the CPU 11 and the built-in PLC 16 and to perform various arithmetic processing, etc. The non-volatile memory 104 stores the sequence program, etc. The retrofitted PLC 100 is connected to the individual components of the numerical controller 1 via the bus 22. The retrofitted PLC 100 exchanges signals via a not-shown I/O unit with the peripheral device provided by a third party or the like and controls the operation of the peripheral device.

Exchange of signals among the CPU 11 (which executes the numerical control processing), the built-in PLC 16 (which executes the built-in PLC processing), and the retrofitted PLC 100 may be carried out using a signal memory area provided in the RAM 13, a signal memory area provided in a not-shown RAM provided in the built-in PLC 16, and a signal memory area provided in the RAM 103. For example, when the CPU 11 transmits command signals F to the built-in PLC 16 and the retrofitted PLC 100, the CPU 11 stores the command signals F in the signal memory area provided in the RAM 13. The built-in PLC 16 refers to the signal memory area provided in the RAM 13 and copies the command signal F for the built-in PLC 16 onto the signal memory area provided in the RAM in the built-in PLC 16 (in other words, the built-in PLC 16 receives the signal). The built-in PLC 16 executes the sequence processing based on the state of the signal. Also, the retrofitted PLC 100 refers to the signal memory area provided in the RAM 13 and copies the command signal F for the retrofitted PLC 100 onto the signal memory area provided in the RAM 103 in the retrofitted PLC 100 (in other words, the retrofitted PLC 100 receives the signal). The retrofitted PLC 100 executes the sequence processing based on the signal. Also, for example, when the built-in PLC 16 or the retrofitted PLC 100 should transmit a command signal G to the CPU 11, the built-in PLC 16 or the retrofitted PLC 100 causes the command signal G to be stored in the signal memory area provided in the RAM in the built-in PLC 16 or the signal memory area provided in the RAM 103 in the retrofitted PLC 100. The CPU 11 refers to the signal memory area provided in the memory of the respective PLCs. The CPU 11 copies the command signal G onto the signal memory area provided in the RAM 13 (in other words, the CPU 11 receives the signal). The CPU 11 executes the numerical control processing based on the state of the signal. The exchange of signals between the built-in PLC 16 and the retrofitted PLC 100 is likewise performed using the signal memory areas defined in each RAM.

Also, the CPU 11 and the built-in PLC 16 has a function to issue an external trigger at least to the retrofitted PLC 100. Issuance of the external trigger by the CPU 11 or the built-in PLC 16 may mean that the CPU 11 or the built-in PLC 16 outputs an interrupt signal to the retrofitted PLC 100 via the bus 22 and writes the interrupt signals in their interrupt resisters. Also, issuance of the external trigger by the CPU 11 or the built-in PLC 16 may also mean that the CPU 11 or the built-in PLC 16 sets a predetermined flag in the shared memory that is shared by the CPU 11, the built-in PLC 16, and the retrofitted PLC 100. In this case, the retrofitted PLC 100 monitors the flag in a short cycle and determines that the external trigger has been issued when the flag has been changed. Use of this external trigger ensures high-speed command transmission even when the retrofitted PLC 100 is executing the sequence processing in contrast to a case where the above-described command signal is used. The external trigger may include multiple modes. For example, when the retrofitted PLC 100 detects the issuance of the external trigger, the retrofitted PLC 100 suspends the currently executed processing and executes the interrupt processing. The retrofitted PLC 100 in the course of the interrupt processing performs the determination which will be described later in accordance with the mode of the external trigger and carries out control associated with start, continuation, and resumption, etc. of the sequence processing. It should be noted chat the execution timing for executing the programs between the CPU 11 and the built-in PLC 16 may be controlled by using techniques disclosed in Japanese Patent No. 3715258 or any other relevant techniques.

Figure 2:
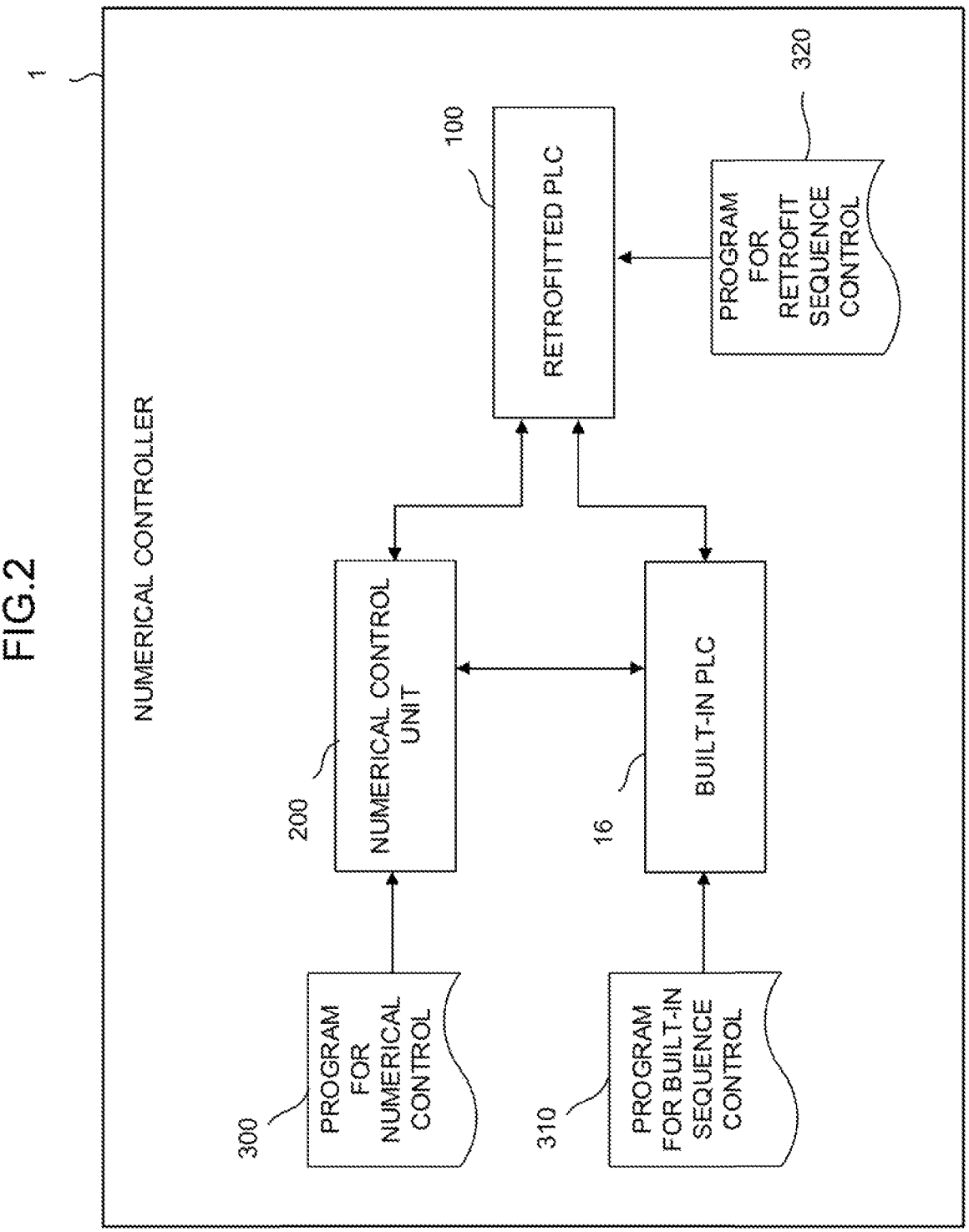
FIG. 2 is a functional block diagram schematically illustrating the numerical controller according to the embodiment.

FIG. 2 is a functional block diagram that schematically illustrates the numerical controller 1 according to the embodiment. The individual functions of the functional blocks illustrated in FIG. 2 may be implemented by the CPU 11 of the numerical controller 1 illustrated in FIG. 1 executing the system program and controlling the operation of the individual components of the numerical controller 1.

The numerical controller 1 of this embodiment includes a numerical control unit 200 that performs numerical control for controlling the machine. The numerical control unit 200 performs the numerical control based on a numerical control program 300 read from the non-volatile memory 14. The numerical control unit 200 may control the machine based on the axis drive command given by the numerical control program 300. Also, the numerical control unit 200 performs control associated with transmission of the command signals to the PLCs, waiting for the command signals from the PLCs, and the like based on auxiliary function commands such as an M code given by the numerical control program 300. When the numerical control unit 200 receives the command for executing the numerical control program 300, the numerical control unit 200 executes the numerical control program 300 for each control period defined by the numerical controller 1. The numerical control unit 200 executes the numerical control program 300 in one control period only for a length of time assigned to this control period. The numerical control program 300 is executed continuously for each control period (i.e., continuously from the point where the execution has been terminated in the previous period). Also, the numerical control unit 200 issues the external trigger to the retrofitted PLC 100 at the time point at which the output of the command signal is terminated based on the numerical control program 300 being executed in the respective control periods. It should be noted that the numerical control unit 200 may continue to execute any processing that is not relevant to the command signal after having issued the external trigger.

Also, the built-in PLC 16 executes the built-in PLC processing (sequence processing) based on a built-in sequence control program 310 that has been read from a not-shown memory for the built-in PLC 16. The built-in PLC 16 carries out exchange of signals with the peripheral device, etc. via the I/O unit 17 based on the built-in sequence control program 310, and performs exchange of the states of the command signals with the numerical control unit 200 and the retrofitted PLC 100. When the built-in PLC 16 executes the built-in sequence control program 310, the numerical control unit 200 notifies the execution start timing for the built-in sequence control program 310 to the built-in PLC 16 using, for example, the prior-art technique disclosed in Japanese Patent No. 3715258. When the execution start timing for the built-in sequence control program 310 is notified from the numerical control unit 200, the built-in PLC 16 executes the built-in sequence control program 310. The built-in PLC 16 executes the built-in sequence control program 310 for the control period defined in the built-in PLC 16 to the extent that the built-in sequence control program 310 can be executed within this control period. At this point, the built-in sequence control program 310 by the built-in PLC 16 is executed continuously for each control period (i.e., continuously from the point where the execution has been terminated in the previous period). Also, the built-in PLC 16 issues the external trigger to the retrofitted PLC 100 at the time point at which the output of the command signal is terminated based on the built-in sequence control program 310 that is being executed in the respective control periods. It should be noted that the built-in PLC 16 may continue to execute any processing that is not relevant to the command signal after having issued the external trigger.

Meanwhile, the retrofitted PLC 100 executes the retrofitted PLC processing (sequence processing) based on a retrofit sequence control program 320 that has been read from the non-volatile memory 104. The retrofitted PLC 100 carries out the exchange of signals with the peripheral device connected thereto via a not-shown I/O unit based on the retrofit sequence control program 320. The retrofitted PLC 100 performs exchange of the states of the command signals with the numerical control unit 200 and the built-in PLC 16. When the retrofitted PLC 100 is instructed to execute the retrofit sequence control program 320, then the execution start timing for the retrofit sequence control program 320 is notified to the retrofitted PLC 100 from the numerical control unit 200 or the built-in PLC 16 in each predetermined control period defined in the retrofitted PLC 100 (in other words, the external trigger is detected). When the execution start timing is notified from the numerical control unit 200 or the built-in PLC 16, the retrofitted PLC 100 executes the retrofit sequence control program 320 to the extent that it can be executed within this control period. At this point, in each control period, the built-in sequence control program 319 is executed continuously for each control period (i.e., continuously from the point where the execution has been terminated in the previous period).

Figure 3:
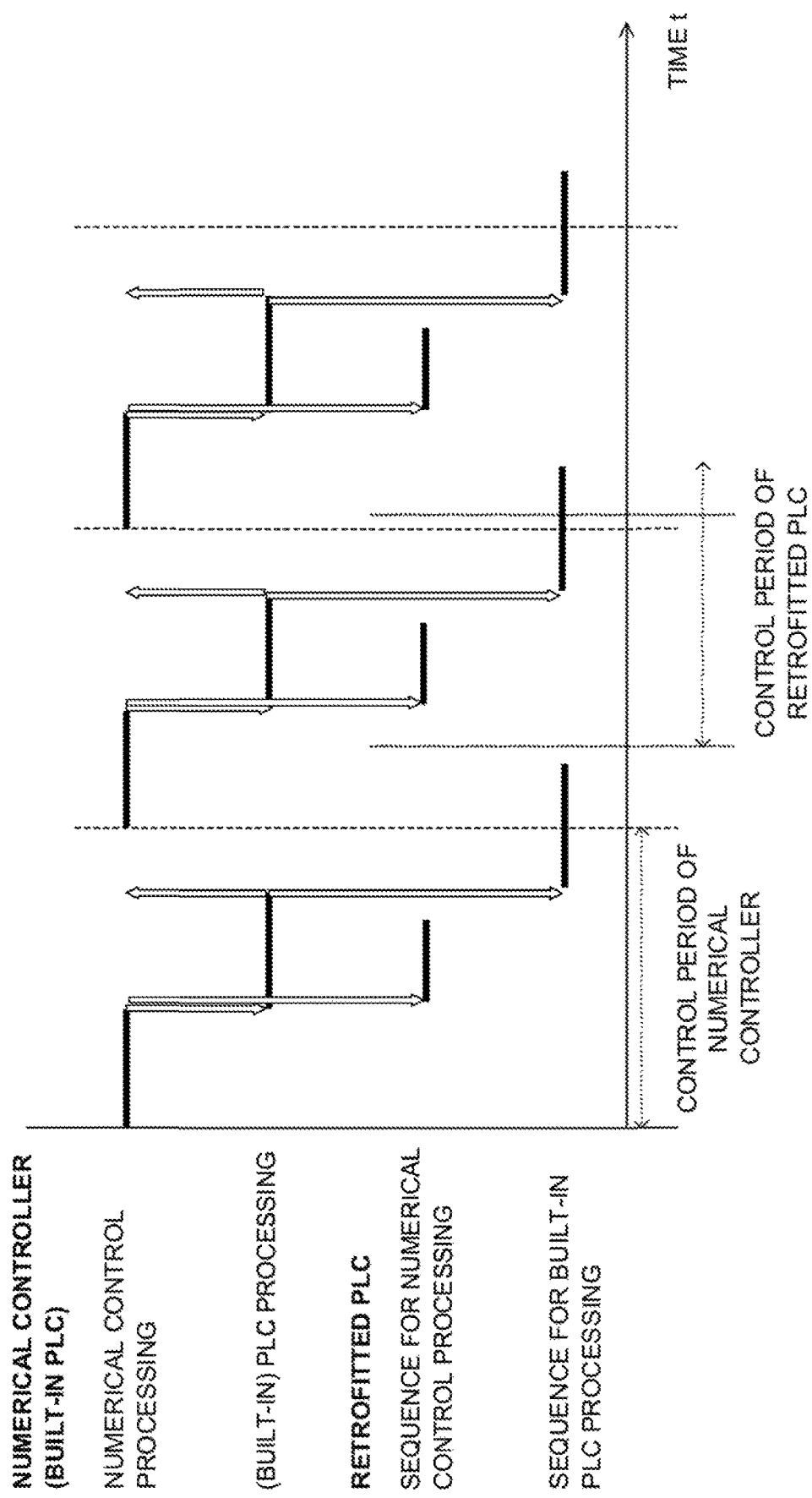
FIG. 3 is a diagram illustrating an example of operation of the numerical controller.

The retrofit sequence control program 320 executed by the retrofitted PLC 100 includes, for example as illustrated in FIG. 3, the sequence processing for numerical control processing which is executed based on the command signal received from the numerical control unit 200 and the sequence processing for built-in PLC processing which is executed based on the command signal received from the built-in PLC 16. When the retrofitted PLC 100 has detected the external trigger from the numerical control unit 200, the retrofitted PLC 100 executes the sequence processing for numerical control processing. Also, when the retrofitted PLC 100 has detected the external trigger from the built-in PLC 16, the retrofitted PLC 100 executes the sequence processing for built-in PLC processing.

Figure 4:
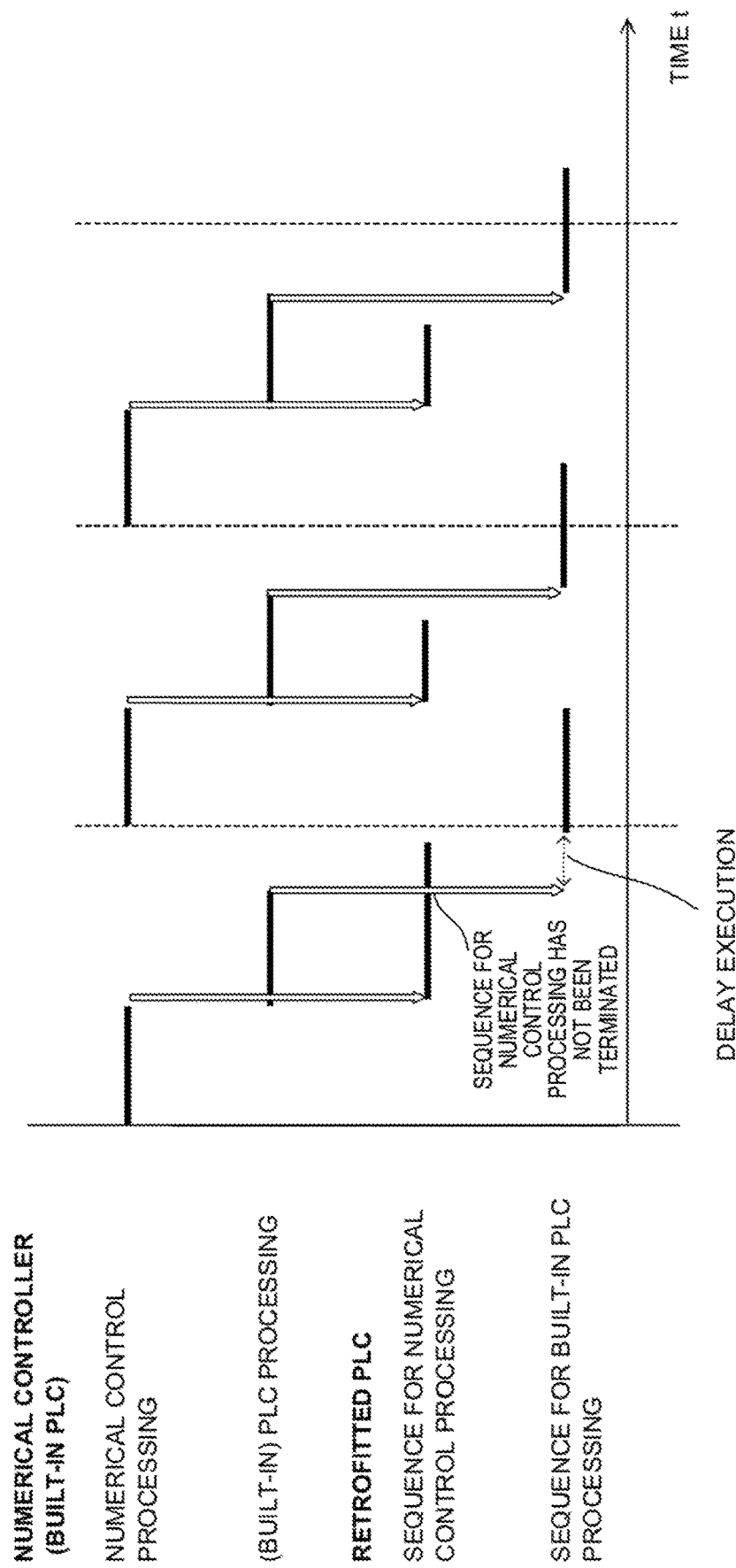
FIG. 4 is a diagram illustrating another example of the operation of the numerical controller.

It should be noted that the sequence processing for numerical control processing may be of lower or higher priority than the sequence processing for built-in PLC processing. FIG. 4 illustrates an example where the sequence processing for numerical control processing has a higher priority than that of the sequence processing for built-in PLC processing and the retrofitted PLC 100 has detected the external trigger from the built-in PLC 16 while the sequence processing for numerical control processing is being executed. In this case, the retrofitted PLC 100 delays the start of the sequence processing for built-in PLC processing until the sequence processing for numerical control processing in this control period is terminated.

Figure 5:
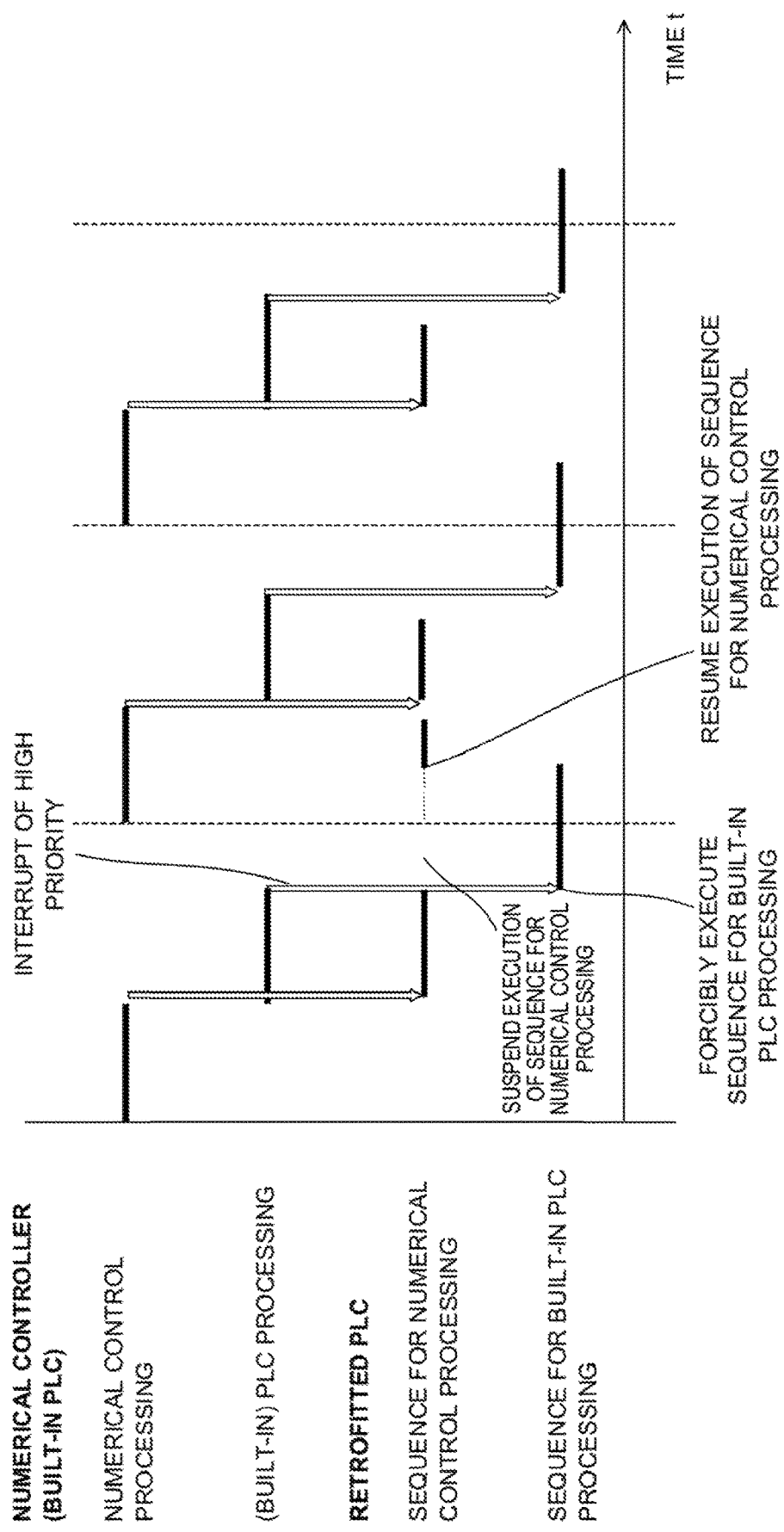
FIG. 5 is a diagram illustrating an example of operation of the numerical controller at the time of occurrence of a critical event.

Further, the external triggers from the numerical control unit 200 and the built-in PLC 16 may include a mode in which the priority of the external triggers is specified. Per example, as illustrated in FIG. 5, when the retrofitted PLC 100 has detected an external trigger of high priority from the built-in PLC 16 while the sequence processing for numerical control processing is being executed, the retrofitted PLC 100 suspends the currently executed sequence processing for numerical control processing and forcibly executes the sequence processing for built-in PLC processing. The retrofitted PLC 100 resumes the execution of the sequence processing for numerical control processing at the time point at which the sequence processing for built-in PLC processing has been terminated. Such a function may be effective and useful at the time of occurrence of a critical event, for example, in a case where the operation of the program associated with machining is stopped (by an alarm or an operation made by an operator) and the peripheral device controlled by the retrofitted PLC 100 needs to be forcibly terminated. When the occurrence of the critical event has been detected, the numerical control unit 200 and the built-in PLC 16 may output a necessary command signal and issue the external trigger to the retrofitted PLC 100 even when the processing in the control period is being performed and is yet to be completed.

Figure 6:
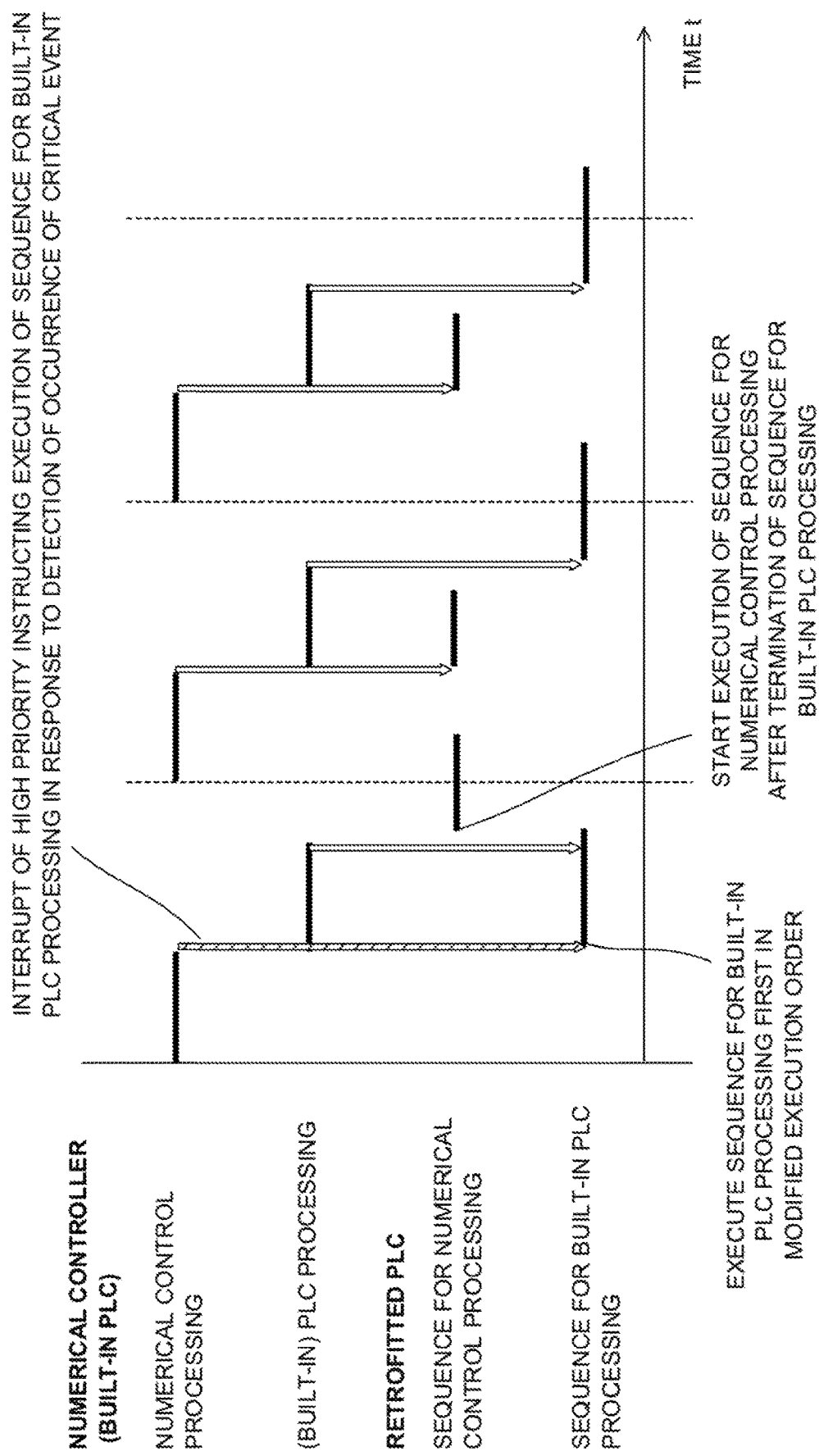
FIG. 6 is a diagram illustrating another example of the operation of the numerical controller at the time of occurrence of a critical event.

Also, a mode for specifying the sequence processing to be executed on the retrofitted PLC 100 may be set in the external trigger in addition to the priority. As has been described with reference to FIGS. 3 to 5, the retrofitted PLC 100 in normal cases executes the sequence for the numerical control processing and the sequence for the built-in PLC processing sequentially in accordance with the order of the numerical control processing and the built-in PLC processing to be executed on the numerical controller. However, the retrofitted PLC 100 may execute the sequence for the numerical control processing and the sequence for the built-in PLC processing in an order different from the order in which the command signals have been received, in the example illustrated m FIG. 6, when the occurrence of the critical event has been detected, the numerical control unit 200 outputs a necessary command signal and issues an external trigger that causes execution of the sequence processing for built-in PLC processing for forcibly terminating the peripheral device, etc. The external trigger may be an external trigger having the highest priority. The retrofitted PLC that has detected this external trigger preferentially executes the sequence processing for built-in PLC processing for forcibly terminating the peripheral device, etc. in place of the sequence processing for numerical control processing which originally should be executed. Also, when the built-in PLC 16 has issued the external trigger in which the mode for executing the sequence processing for numerical control processing is specified, then the retrofitted PLC which has detected this external trigger may preferentially execute the sequence processing for numerical control processing in accordance with a modified order in place of the sequence processing for built-in PLC processing which originally should be executed. Implementation of such a function makes it possible to cause the retrofitted PLC 100 to execute flexible sequence processing to suit the actual situation.

Also, a critical event table as illustrated in FIG. 7 may be provided for recognizing critical events in the control operation to control the machine and an external trigger having a higher priority may be issued from the numerical control unit 200 or the built-in PLC 16 when an event registered in this critical event table has occurred. The numerical control unit 200 may determine, as illustrated in the critical event table of FIG. 7, that the emergency stop signal has been generated when the numerical control unit 200 detected the fact that the value of the signal G 8.4 has become 0. Also, the numerical control unit 200 issues an external trigger of high priority and instructing the emergency stop to the retrofitted PLC 100. It should be noted that modes of the external triggers issued for each event may be associated with each other and additionally managed on the critical event table.

It should be noted that the above-described priority is not limited to two ranks of a normal rank and a higher rank and multiple ranks may be set. In either case, when the retrofitted PLC 300 has detected the external trigger of high priority, the processing based on the external trigger of low priority which is currently being executed on the retrofitted PLC 100 will be suspended. Also, for processing based on the external triggers of the same level of priority, the operation will be performed in accordance with the priority levels assigned to the respective processing in the retrofitted PLC 100.

Whilst the embodiments of the present invention have been described in the foregoing, the present invention is not limited to the examples of the embodiments described above and can be implemented in various modes with modifications made thereto as appropriate.

The invention claimed is:

1. A numerical controller comprising:
   a numerical control unit;
   a built-in PLC; and
   a retrofitted PLC operating at a predetermined control period different from control periods of the numerical control unit and the built-in PLC, the retrofitted PLC being configured to
   detect external triggers issued from the numerical control unit and the built-in PLC,
   execute a sequence processing for numerical control processing upon detection of the external trigger issued from the numerical control unit, and
   execute a sequence processing for built-in PLC processing upon detection of the external trigger issued from the built-in PLC.

2. The numerical controller according to claim 1, wherein a priority order is set for the sequence processing for the numerical control processing and the sequence processing for the built-in PLC processing, and
   the retrofitted PLC suspends a currently executed sequence processing of low priority and starts execution of a sequence processing of high priority when the retrofitted PLC detects an external trigger corresponding to the sequence processing of high priority during execution of the sequence processing of low priority.

3. The numerical controller according to claim 1, wherein the external trigger includes information on a priority order, and
   the retrofitted PLC suspends a currently executed sequence processing associated with an external trigger of low priority and starts execution of a sequence processing associated with an external trigger of high priority when the retrofitted PLC detects the external trigger of high priority during execution of the sequence processing associated with the external trigger of low priority.

4. The numerical controller according to claim 3, further comprising a critical event table that specifies in advance pieces of information on critical events associated with control operation, wherein
   the numerical control unit or the built-in PLC detects a critical event associated with the control operation based on the pieces of information on the critical events specified in the critical event table and issues the external trigger of high priority based on a result of detection of the critical event.

5. The numerical controller according to claim 1, wherein the external trigger includes information instructing execution of a sequence processing to be executed, and
   the retrofitted PLC changes an order of the sequence processing for numerical control processing and the sequence processing for built-in PLC processing and executes the sequence processing for built-in PLC processing when the retrofitted PLC detects an external trigger that includes the information instructing execution of the sequence processing for built-in PLC processing from the numerical control unit, and
   the retrofitted PLC changes the order of the sequence processing for numerical control processing and the sequence processing for built-in PLC processing and executes the sequence processing for the numerical control processing when the retrofitted PLC detects an external trigger that includes the information instructing execution of the sequence processing for numerical control processing front the built-in PLC.

* * * * *